(12) United States Patent
Hunter

(10) Patent No.: US 12,655,864 B1
(45) Date of Patent: Jun. 16, 2026

(54) QUICK RELEASE NUT

(71) Applicant: Jacob Hunter, Elk City, OK (US)

(72) Inventor: Jacob Hunter, Elk City, OK (US)

( * ) Notice: Subject to any disclaimer, the term of this patent is extended or adjusted under 35 U.S.C. 154(b) by 70 days.

(21) Appl. No.: 18/355,610

(22) Filed: Jul. 20, 2023

Related U.S. Application Data

(60) Provisional application No. 63/391,857, filed on Jul. 25, 2022.

(51) Int. Cl.
F16B 37/08 (2006.01)

(52) U.S. Cl.
CPC ...... F16B 37/0857 (2013.01); F16B 37/0864 (2013.01)

(58) Field of Classification Search
CPC .................................................. F16B 37/0864
USPC ........................................................ 411/433
See application file for complete search history.

(56) References Cited

U.S. PATENT DOCUMENTS

| | | | | | |
|---|---|---|---|---|---|
| 1,475,907 | A | * | 11/1923 | Volman | F16B 37/0864 279/7 |
| 2,367,480 | A | * | 1/1945 | Beswick | F16B 39/36 81/53.2 |
| 2,489,613 | A | * | 11/1949 | Beswick | F16B 37/0864 411/433 |
| 2,491,543 | A | * | 12/1949 | Alfonso | B23D 21/08 74/424.78 |
| 3,352,341 | A | * | 11/1967 | Schertz | F16B 37/0864 411/270 |
| 4,083,393 | A | * | 4/1978 | Okada | F16B 37/0857 411/935.1 |
| 4,531,872 | A | * | 7/1985 | Warkotsh | F16B 37/0857 411/433 |
| 4,768,909 | A | * | 9/1988 | Warkotsch | B62K 11/007 411/432 |
| 4,930,961 | A | * | 6/1990 | Weis | F16B 37/0864 411/266 |
| 5,755,544 | A | * | 5/1998 | Muller | F16B 37/0864 411/433 |
| 5,800,108 | A | * | 9/1998 | Cabahug | F16B 37/0857 411/433 |
| 6,179,539 | B1 | * | 1/2001 | Benoit | F16B 37/0842 411/278 |
| 6,974,291 | B2 | * | 12/2005 | Li | F16B 37/0864 411/429 |
| 7,416,375 | B2 | * | 8/2008 | Virdee | F16B 37/0857 411/433 |
| 9,217,457 | B2 | * | 12/2015 | Warkotsch | B62K 25/02 |
| 11,306,763 | B2 | * | 4/2022 | Nakaya | F16B 37/0864 |
| 11,667,409 | B2 | * | 6/2023 | Arulf | B64G 1/6457 411/433 |

* cited by examiner

*Primary Examiner* — Flemming Saether
(74) *Attorney, Agent, or Firm* — Phillips Murrah PC; Martin G. Ozinga

(57) ABSTRACT

A quick release nut apparatus, system, and method comprising surfaces between threaded segments and a sleeve in a fully closed or engaged position in contact and parallel to the axis of threads; The quick release nut apparatus, system, and method includes handles that are used for ease of operation as well as light torque or loosening when engaged or disengaged from the external threads, positive locking of the segments in an engaged position that increases tolerance to high forces or impact loading, and the sleeve inside of a housing that props or unprops the threaded segments.

1 Claim, 4 Drawing Sheets

QUICK RELEASE NUT

CROSS-REFERENCE TO RELATED APPLICATIONS

The present application claims priority from U.S. Provisional Patent Application Ser. No. 63/391,857, filed on Jul. 25, 2022, and is hereby incorporated by reference herein.

BACKGROUND OF THE INVENTION

1. Field of the Invention

In general, the present invention relates to an apparatus, system, and method for enabling quick release of a nut from a threaded member. More particularly, the present invention provides an improved quick release nut that may be operated with one hand.

2. Description of the Prior Art

Currently, there are a number of solutions for enabling easy engagement and disengagement of threaded members. Some of these solutions attempt to partially radial thread engagement with simple release mechanisms, but these solutions fail to meet the needs of particular applications because of the low strength. Other solutions attempt to use multiple loose components, but these solutions are similarly unable to meet the needs of the industry because these components require both hands to operate as well as introduce potential for loss. Still, other solutions seek to use clearance diameter at an angle to the threaded axis, but these solutions also fail to meet industry needs because of reduced strength.

It would be desirable to have an internally threaded assembly that can be positioned anywhere on a threaded rod without having to rotate it past all of the threads. Furthermore, it would be desirable to have this assembly be operable with a single hand. Still, further, it would also be desirable to have such an assembly be able to withstand as much if not more force than a standard nut used on the same threaded rod. The disclosed device advantageously fills these needs and addresses the aforementioned deficiencies by providing an assembly that can be quickly placed along a threaded rod and released to engage the threads.

Present day operations are extremely expensive, and an effort to increase the overall efficiency of the operation while minimizing expense requires the essentially continuous operation. Thus, it is imperative that downtime be minimized. The above discussed limitation in the prior art is not exhaustive. Thus, there is a need for an apparatus, method, and system to remove threaded members and so forth easily and quickly. The current invention provides an inexpensive, time saving, more reliable apparatus and system where the prior art fails.

SUMMARY OF THE INVENTION

In view of the foregoing disadvantages inherent in the known types of nut releasers now present in the prior art, the present invention provides a new and improved apparatus, system, and method, which is easier to utilize and more time efficient. As such, the general purpose of the present invention, which will be described subsequently in greater detail, is to provide a new and improved quick nut release apparatus, system, and method, which has all the advantages of the prior art devices and none or fewer of the disadvantages.

To attain this, the present invention essentially comprises a new and improved assembly that discloses a quick release nut, which may be made up of the following components threaded segments, mechanical biasing mechanisms, a sleeve, a housing, and handles. These components are related as follows: (1) set of two or more internally threaded segments are contained in the center of an assembly and are pushed away from each other with rigs on their outer diameter for engagement with the sleeve (2) the mechanical biasing mechanism such as a flat spring or a compression spring (3) the sleeve is used to contain and position the internally threaded segments radially using an internal ridge to engage the segments and force them together or allow them to move apart; (4) the housing contains and guides the internally threaded segment set as well as the sleeve and mechanical biasing mechanism radially as well as axially; and (5) handles are attached to both the housing as well as the sleeve.

The device may also have one or more of the following: (1) threaded segments may have pins or keys that engage the housing allowing torque to be transmitted from the housing to the segments enabling axil movement of the assembly along the threaded rod once engaged; (2) mechanical biasing mechanisms without the housing to force the sleeve up or down relative to the threaded segments creating a normally engaged or normally released configuration for the assembly; (3) mechanical biasing mechanisms engaged with the internally threaded segments to bias them inward or outward depending on application preference; (4) various different engagement patterns between the outside diameter of the internally threaded segments as well as the inside diameter of the sleeve; and (5) housing with easily removable cap enabling cleaning as well as a replacement of segments that are damaged or for different thread configurations.

The disclosed device is unique when compared with other known devices and solutions because it provides: (1) full radial thread engagement by the threaded segments when in the engaged position; (2) the sleeve and positively locks the threaded segments into the engaged position with radial forces on the segments being fully supported by the sleeve; and (3) single handed actuation between engagement and disengagement.

The disclosed device is unique in that it is structurally different from other known devices or solutions. More specifically, the device is unique due to the presence of (1) surfaces between the threaded segments and the sleeve in the fully closed or engaged position is in contact and parallel to the axis of threads; (2) handles are used for ease of operation as well as light torque or loosening when engaged or disengaged from the external threads; (3) positive locking of the segments in an engaged position increases tolerance to high forces or impact loading; and (4) the sleeve inside of the housing that props or unprops the threaded segments.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved quick release nut apparatus, system, and method, which may be easily and efficiently utilized.

It is a further object of the present invention to provide a new and improved quick release nut apparatus, system, and method, which is of a durable and reliable construction and may be utilized with multiple types of applications in the oil and gas field as well as other applications.

An even further object of the present invention is to provide a new and improved quick release nut apparatus, system, and method, which is generally susceptible to a low cost of manufacture with regard to both materials and labor, and which accordingly is then susceptible to low prices of sale to the consuming industry, thereby making such tool economically available to those in the field.

Still another object of the present invention is to provide a new and improved quick release nut apparatus, system, and method, which provides all of the advantages of the prior art, while simultaneously overcoming some of the disadvantages normally associated therewith.

Another object of the present invention is to provide a new and improved quick release nut apparatus, system, and method that does not require more than one hand.

Yet another object of the present invention is to provide a new and improved quick release nut that provides a surface between the threaded segments and the sleeve in the fully closed or engaged position in contact and parallel to the axis of threads.

Still another object of the present invention is to provide a new and improved quick release nut apparatus, system, and method that provides handles that are used for ease of operation as well as light torque or loosening when engaged or disengaged from the external threads.

An even further object of the present invention is to provide a new and improved quick release nut apparatus, system, and method that provides a robust device with positive locking of the segments in an engaged position, which increases tolerance to high forces or impact loading and may include a sleeve inside of the housing that props or unprops the threaded segments.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices.

DETAILED DESCRIPTION OF THE PREFERRED EMBODIMENTS

Figure 1:
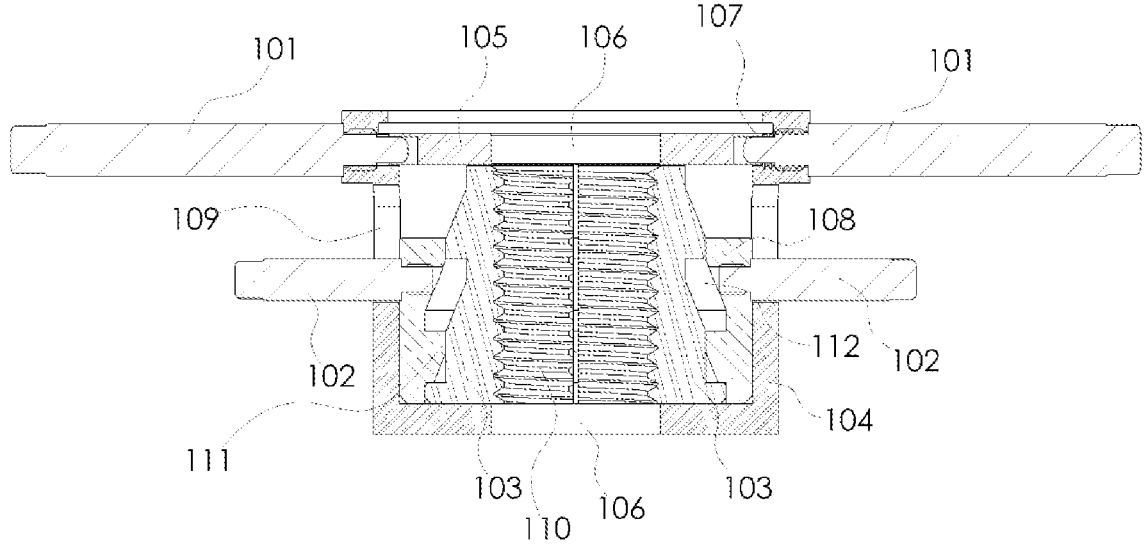
FIG. 1 is a cross sectional drawing of the quick release nut in the engaged configuration in a preferred embodiment in accordance with the present invention.

Referring to the illustrations, drawings, and pictures, reference character 100 generally designates a new and improved quick release nut apparatus, system, and method of using same constructed in accordance with the present invention. Invention 100 is generally used in oil and gas well operations but may be utilized in other applications. The current invention should not be considered limited to just quick release nut operations.

Now referring to the illustrations, the invention may be made up of the following components: a set of three internally threaded segments 103, a sleeve 108, a housing 104 with a removable housing cap 105, housing handles 101, sleeve handles 102, segment pins 206 and multiple compression springs (not shown). These components are related as follows: (1) paired set of three or more internally threaded segments 103 are housed at the center of the assembly held away from each other using compression springs between each of segments 111; (2) the sleeve 108 radially confines the segments 111 from excessive separation by the compressions springs between the segments 111; (3) compression springs are evenly spaced around sleeve 108 face perpendicular to the axis of the assembly applying force between the sleeve 108 and the housing cap 105; (4) the housing 104 with removable housing cap 105 contains the seal inside of which is the segments 111; (5) handle slots 109 through the housing 104 wall enable the sleeve handles 102 to be attached to the sleeve 108 and move the sleeve 108 axially relative to the housing 104; (6) housing handles 101 are attached parallel to the sleeve handles 102 spaced away from the sleeve handles 102 to enable them to be squeezed together by hand to actuate the sleeve 108 relative to the threaded segments 103 and housing 104, which moves the sleeve 108 axially releasing the threaded segments 103 from the engaged position enabling the threaded segments 103 to freely move away from the axis to disengage the threaded rod; and (7) segment pins 206 placed on either surface of the segments 111 perpendicular to the axis of the assembly engage the housing 104 ends to guide the segments 111 radially as they move between the engaged and disengaged positions. It should further be noted that: the threaded segments 103 would be machined as a single component and then split into segments to create a matched set of segments that can precisely engage the threads of an externally threaded rod. The segments would typically be made of a high strength material such as a quenched and tempered steel.

Berrillium copper or nickel bronze could be used in potentially explosive environments. The segments pins 206 also transmit torque applied to the housing 104 and to the segments 111 enabling them to be tightened up against a surface perpendicular to the axis of the assembly or threaded rod.

FIG. 1 is generally a cross section of the quick release nut or invention 100. Threaded segments 103 are shown in the engaged position. In this embodiment there are three internally threaded segments 103 but there could be as few as two or as many as desired. In the shown state internal threads 110 would be fully engaged with externally threaded components of the proper diameter and pitch. The sleeve 108 shown can be actuated along the axis of the assembly using the sleeve handles 102, which protrude through the sleeve handle slot(s) 109. In the position shown, internal surface of the sleeve 108 engages the external surface of the segments 111. These surfaces ideally are parallel to the threaded axis so that radial forces generated by axial force on the thread can be supported by the sleeve 108 without generating axial force. The surfaces could be placed at a slight angle for easier engagement, but axial force generation would increase as the angle deviates from parallel to the axis.

The sleeve 108 may be composed of a continuous ring such that hoop stress can be supported. The housing 104 serves the function of holding all of the components together as well as enabling attachment of the housing handles 101, which is used for handling, pulling against to disengage, and application of torque for tightening and loosening when engaged. A through hole 106 found at the center of the housing 104 and well as the housing cap 105, allows the threaded component to pass through the center.

Figure 2:
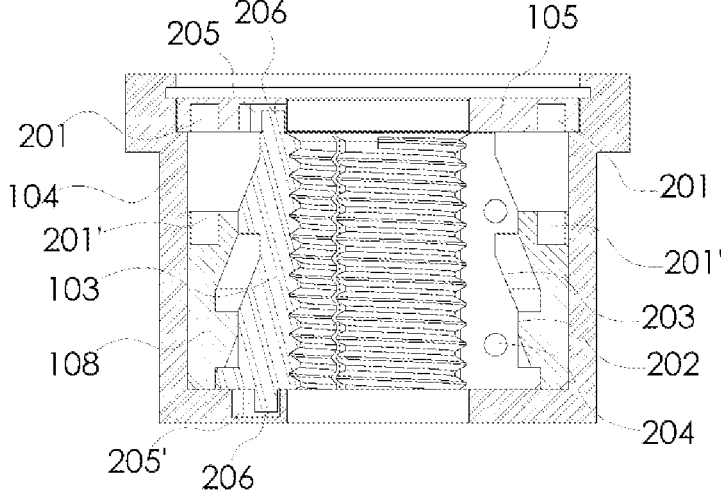
FIG. 2 is a cross sectional drawing of the quick release nut perpendicular to the handles in the engaged configuration in a preferred embodiment in accordance with the present invention.

FIG. 2 is generally a cross section of the quick release nut or invention 200 on the threaded axis, perpendicular to the cross section in FIG. 1. A compression spring pocket 204 in the housing cap 105 and the corresponding compression spring pocket 204 in a sleeve 201 are shown. In this embodiment, compression springs (not shown) are placed between the cap 105 and the sleeve 108 to mechanically bias the assembly to the engaged position as shown. There are also compression spring pocket(s) 204 in the internally threaded segments 103 between each of the segments 111. These compression springs (not shown) are used to mechanically bias the segments 111 out against the inside diameter of the sleeve 108 such that when the assembly is disengaged, the internally threaded segments 103 move away from the externally threaded component. Other forms of mechanical biasing mechanisms other than compressions springs could be used to bias internal components of this assembly. The segment pins 206 shown protruding from the top and bottom surface of the internally threaded segments 103 engage segment pin slots 205 in the housing 104 and in the housing cap 105. This engagement guides the internally threaded segments 103 in and out and also enable torque to be transmitted through the housing 104 and housing handles 101 to the internally threaded segments 103.

Figure 3:
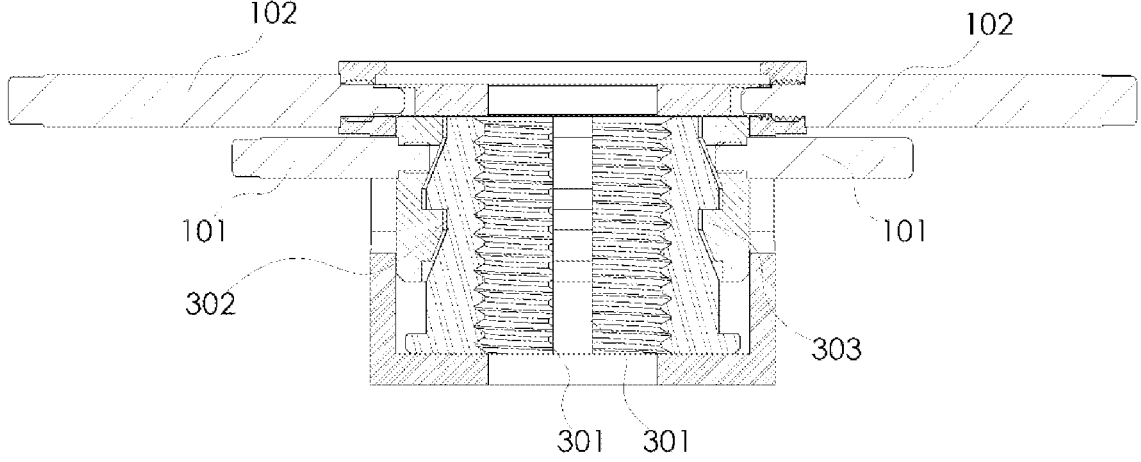
FIG. 3 is a cross sectional drawing of the quick release nut in the engaged configuration in a preferred embodiment in accordance with the present invention.

FIG. 3 is generally a cross section of the quick release nut or invention 300. Internally threaded segments 103 are shown in the disengaged position. Internally threaded segment surface 301 is pushed apart by the compression springs (not shown) between the segments 111. The sleeve 108 is moved upward in the housing 104 by squeezing the sleeve handle 102 towards the housing handle 101. This allows external ribs 303 on the internally threaded segments 103 to expand into groove(s) 302 on the inside diameter of the sleeve 108. Two grooves 302 and ribs 303 are shown in this embodiment, but any number of ribs 303 should be utilized as long as the depth of the grooves 302 is greater than the thread depth to allow full disengagement of the internally threaded segments 103 from the externally threaded component (not shown).

Figure 4:
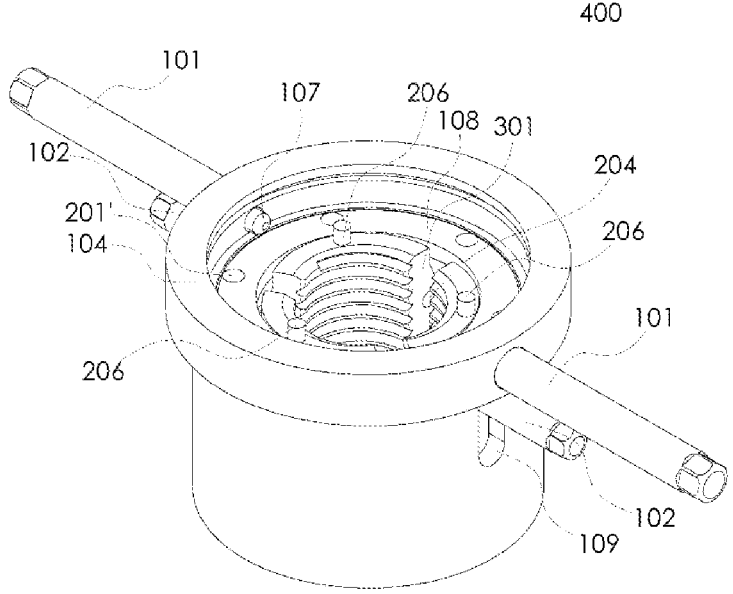
FIG. 4 is an isometric drawing of the quick release nut with cap removed in the released configuration in a preferred embodiment in accordance with the present invention.

FIG. 4 is generally an isometric image of the quick release nut or invention 400 with the housing cap 105 removed so that internal components are visible. The quick release nut or invention 400 is in the disengaged configuration with the internally threaded segments 103 moved away from the center.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

Changes may be made in the combinations, operations, and arrangements of the various parts and elements described herein without departing from the spirit and scope of the invention. Furthermore, names, titles, headings, and general division of the aforementioned are provided for convenience and should, therefore, not be considered limiting.

What is claimed is:

1. A nut for a threaded member comprising:

a tubular housing having an exterior, an interior, a top, a bottom with an opening for axially positioning a threaded member into said interior, a first side between said top and said bottom, and a first slotted aperture on said first side between said exterior and said interior, a second side between said top and said bottom, and a second slotted aperture on said second side between said exterior and said interior;

a sleeve positioned in said interior of said tubular housing having a first side, a second side and said sleeve adapted to move upward and downward inside said interior of said tubular housing;

at least one threaded segment axially positioned in said sleeve adapted to removably attach to said threaded member for holding said threaded member in said sleeve;

a first handle movably positioned on said first side of said exterior of said housing and attached to said first side of said sleeve through said first slotted aperture;

a second handle movably positioned on said second side of said exterior of said housing and attached to said second side of said sleeve through said second slotted aperture; and wherein said first handle and said second handle are adapted to removably position said at least one threaded segment to attach to said threaded member for holding said threaded member in said sleeve and releasing said at least one threaded segment from said threaded member.

* * * * *